United States Patent
Nemesh et al.

(10) Patent No.: US 8,215,432 B2
(45) Date of Patent: Jul. 10, 2012

(54) BATTERY THERMAL SYSTEM FOR VEHICLE

(75) Inventors: Mark D. Nemesh, Troy, MI (US); Wissam Ibri, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1086 days.

(21) Appl. No.: 12/117,931

(22) Filed: May 9, 2008

(65) Prior Publication Data
US 2009/0280395 A1    Nov. 12, 2009

(51) Int. Cl.
*H01M 10/30* (2006.01)
(52) U.S. Cl. .................... 180/68.2; 180/68.1; 429/62
(58) Field of Classification Search ........ 180/68.1–68.2, 180/65.1, 65.21–65.22, 65.265, 65.275, 68.4–68.5, 180/69.6; 62/185, 201, 239, 259.2; 236/34.5; 429/62, 120
See application file for complete search history.

(56) References Cited

U.S. PATENT DOCUMENTS

| | | | |
|---|---|---|---|
| 5,305,613 A * | 4/1994 | Hotta et al. | 62/209 |
| 5,507,153 A * | 4/1996 | Seto et al. | 62/133 |
| 5,549,153 A * | 8/1996 | Baruschke et al. | 165/42 |
| 5,606,239 A * | 2/1997 | Schumann | 361/699 |
| 5,624,003 A * | 4/1997 | Matsuki et al. | 180/65.1 |
| 5,678,760 A * | 10/1997 | Muso et al. | 237/2 A |
| 5,730,237 A * | 3/1998 | Matsuki et al. | 180/65.1 |
| 5,937,664 A * | 8/1999 | Matsuno et al. | 62/259.2 |
| 6,138,466 A * | 10/2000 | Lake et al. | 62/199 |
| 6,357,541 B1 * | 3/2002 | Matsuda et al. | 180/68.2 |
| 6,394,210 B2 * | 5/2002 | Matsuda et al. | 180/68.1 |
| 6,422,027 B1 * | 7/2002 | Coates et al. | 62/259.2 |
| 6,450,275 B1 * | 9/2002 | Gabriel et al. | 180/65.23 |
| 6,467,286 B2 * | 10/2002 | Hasebe et al. | 62/185 |
| 6,705,101 B2 * | 3/2004 | Brotz et al. | 62/198 |
| 7,007,856 B2 * | 3/2006 | La Falce et al. | 237/12.3 B |
| 7,147,071 B2 * | 12/2006 | Gering et al. | 237/12.3 B |
| 7,455,136 B2 * | 11/2008 | Pleune et al. | 180/68.1 |
| 7,600,391 B2 * | 10/2009 | Naik et al. | 62/238.6 |
| 7,789,176 B2 * | 9/2010 | Zhou | 180/65.1 |
| 7,841,431 B2 * | 11/2010 | Zhou | 180/65.1 |
| 7,890,218 B2 * | 2/2011 | Adams et al. | 700/300 |
| 7,975,757 B2 * | 7/2011 | Nemesh et al. | 165/42 |
| 2002/0043413 A1 | 4/2002 | Kimishima et al. | |
| 2002/0184908 A1 | 12/2002 | Brotz et al. | |
| 2007/0022772 A1 * | 2/2007 | Zhu et al. | 62/259.2 |
| 2009/0249807 A1 * | 10/2009 | Nemesh et al. | 62/117 |
| 2011/0088959 A1 * | 4/2011 | Corley | 180/65.245 |

FOREIGN PATENT DOCUMENTS

| | | |
|---|---|---|
| DE | 10128164 A1 | 12/2002 |
| DE | 10207343 A1 | 7/2003 |

* cited by examiner

*Primary Examiner* — John Walters
*Assistant Examiner* — James Triggs

(57) ABSTRACT

A battery thermal system for use in a vehicle having a power plant, an air conditioning system and a battery pack, and a method of operation, is disclosed. The battery thermal system may include a refrigerant-to-coolant heat exchanger that selectively receives a refrigerant from the vehicle air conditioning system; a battery radiator located adjacent to a cooling fan; a valve that receives a liquid coolant from the battery pack and selectively redirects the liquid coolant to the refrigerant-to-coolant heat exchanger and the battery radiator; and an electric pump for pumping the liquid coolant through the battery pack, the valve, the refrigerant-to-coolant heat exchanger and the battery radiator. The battery thermal system may also include a battery coolant heater for selectively heating the coolant that flows into the battery pack.

8 Claims, 2 Drawing Sheets

BATTERY THERMAL SYSTEM FOR VEHICLE

BACKGROUND OF INVENTION

The present invention relates generally to thermal systems for battery packs in vehicles.

Advanced automotive vehicles are being introduced that employ a battery pack to store large amounts of energy for electric propulsion systems. These vehicles may include, for example, plug-in hybrid electric vehicles, electric vehicles with an internal combustion engine that is used as a generator for battery charging, and fuel cell vehicles. In general, these battery packs require some type of thermal system for cooling and warming the battery pack.

Typical battery thermal systems used to cool and warm the battery pack rely on air flow from the vehicle HVAC system. This may be passenger cabin air that is directed through the battery pack. But these systems suffer from drawbacks such as low heat rejection due to the low heat transfer coefficient of air, interior passenger cabin noise, vibration and harshness (NVH) due to battery blower motor and air rush noise, limited battery cooling capacity after the vehicle has been parked in the sun (due to high air temperatures in the passenger cabin at the beginning of the drive cycle), and difficulty in ensuring that an air inlet grille between the passenger cabin and the battery thermal system does not get accidentally blocked by vehicle passengers (resulting in reduced or no battery air cooling flow).

SUMMARY OF INVENTION

An embodiment contemplates a battery thermal system for use in a vehicle having a power plant, an air conditioning system and a battery pack. The system may include a refrigerant-to-coolant heat exchanger that selectively receives refrigerant from the vehicle air conditioning system; a battery radiator located adjacent to a cooling fan; a valve that receives a coolant from the battery pack and selectively redirects the coolant to the refrigerant-to-coolant heat exchanger and the battery radiator; and an electric pump for pumping the liquid coolant through the battery pack, the valve, the refrigerant-to-coolant heat exchanger and the battery radiator. The system may also include a battery coolant heater.

An embodiment contemplates a vehicle comprising a power plant, a radiator configured to cool the power plant, a cooling fan located adjacent to the radiator and configured to draw air through the radiator, a battery pack, and a battery thermal system. The battery thermal system may include a battery radiator located adjacent to the radiator and in fluid communication with the battery pack, a battery coolant heater located upstream of the battery pack and configured to receive a flow of a liquid coolant therethrough, and an electric pump for pumping the liquid coolant through the battery pack, the battery radiator, and the battery coolant heater.

An embodiment contemplates a method of thermally controlling a battery pack in a vehicle having an air conditioning system and a battery thermal system, the method comprising the steps of: detecting that cooling of the battery pack is needed; activating a pump to pump a liquid coolant through the battery pack and the battery thermal system if the need for battery pack cooling is detected; actuating a valve to direct the liquid coolant through a battery radiator if the need for battery pack cooling is detected and the air conditioning system is not operating; and actuating the valve to direct the liquid coolant through a refrigerant-to-coolant heat exchanger if the need for battery pack cooling is detected and the air conditioning system is operating.

An advantage of an embodiment is that common battery thermal components can be used for a vehicle that has option of either an internal combustion engine or a fuel cell as its power plant. Another advantage of an embodiment is that the battery thermal system provides battery cooling whether the vehicle air conditioning system is off or on. Still another advantage is that the battery thermal system provides better heat transfer by employing a liquid rather than air as the heat transfer medium. Another advantage of an embodiment is that the battery thermal system components can be located outside of the passenger cabin, thus minimizing any reduction in passenger cabin interior space. And, an air grille in the passenger cabin, needed for the cabin air cooling systems, is eliminated, thus avoiding blockage concerns. Moreover, NVH concerns that arise with passenger cabin air cooling are eliminated since air is not drawn from the passenger cabin to cool the battery pack. Another advantage is that battery self-heating or added battery heating are possible.

DETAILED DESCRIPTION

Figure 1:
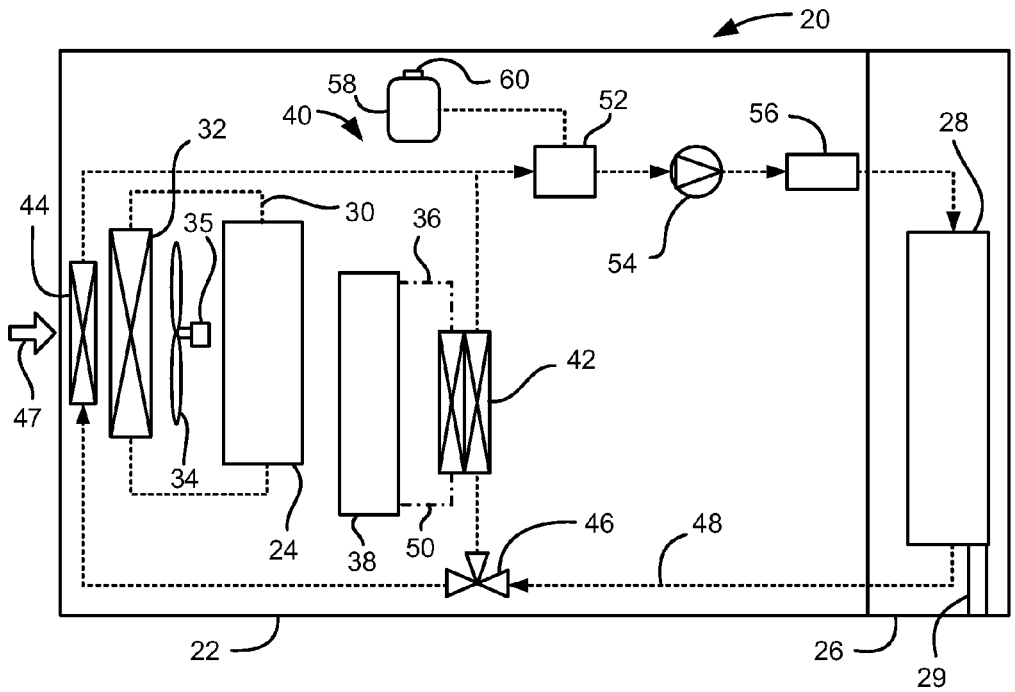
FIG. 1 is a schematic diagram of a vehicle having a battery thermal system.
Figure 2:
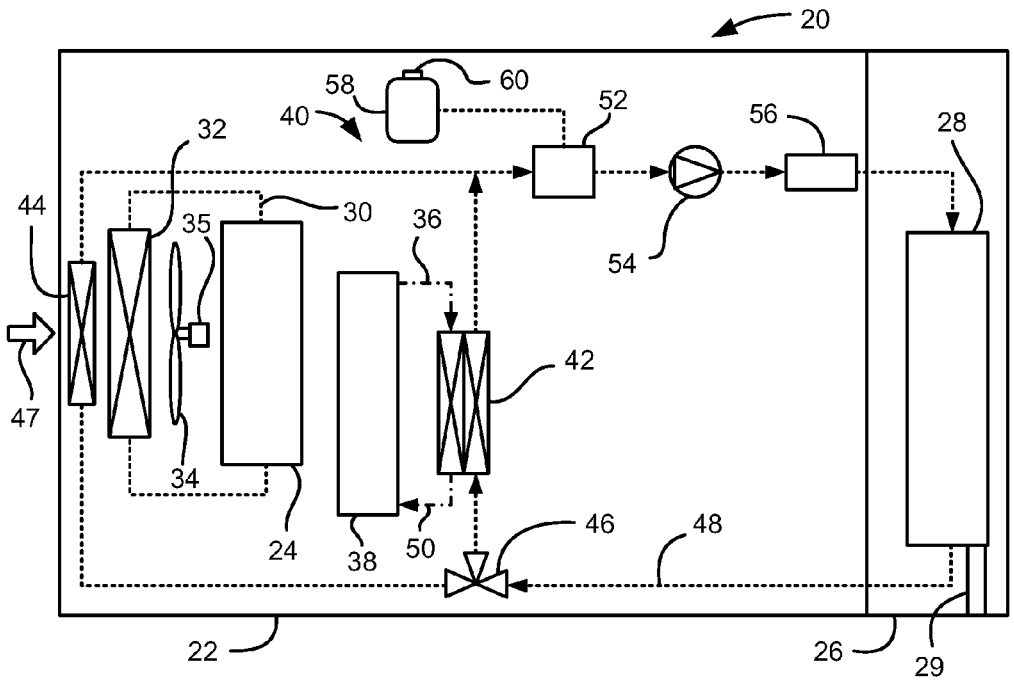
FIG. 2 is a view similar to FIG. 1, but illustrating a different mode of operation.
Figure 3:
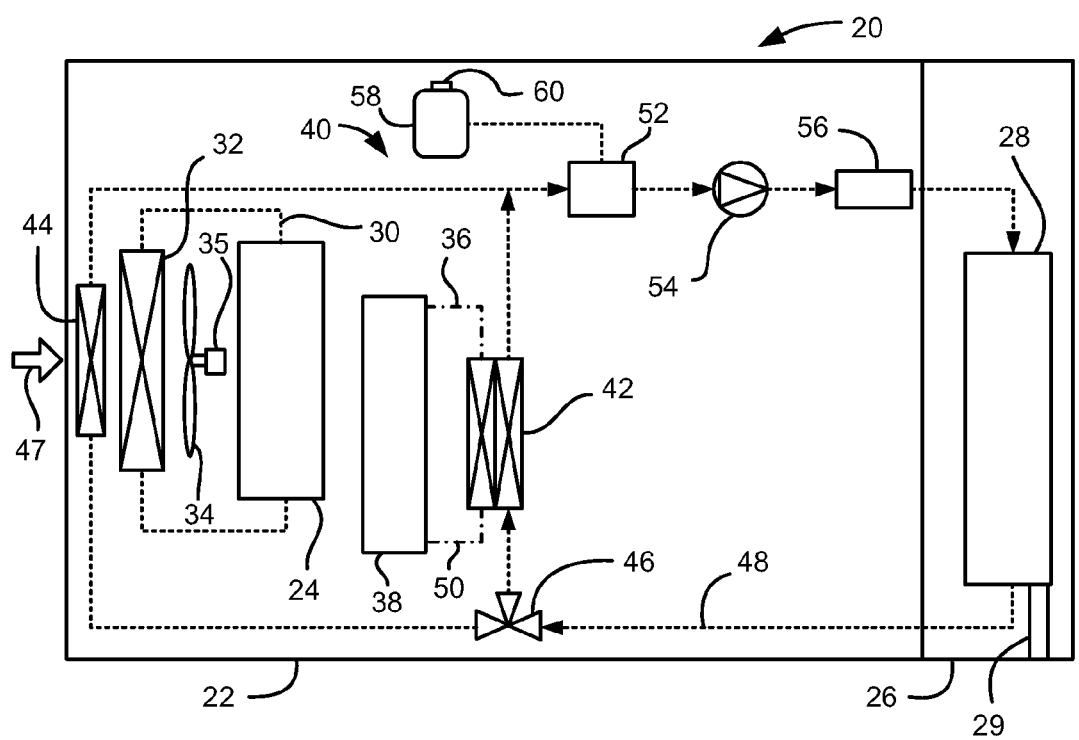
FIG. 3 is a view similar to FIG. 1, but illustrating yet another mode of operation.

Referring to FIGS. 1-3, a vehicle, indicated generally at 20, is shown. The vehicle 20 includes an engine compartment 22, within which is mounted a power plant 24, and a passenger cabin/cargo area 26, within which is mounted a battery pack 28. Alternatively, the battery pack 28 may be mounted outside of the passenger cabin/cargo area 26. The battery pack 28 may include a plug-in charger 29, if so desired. The power plant 24 may be, for example, an internal combustion engine or a fuel cell. The power plant 24 may have coolant lines 30 extending to a radiator 32, which may be located adjacent to a cooling fan 34. The cooling fan may be driven by an electric motor 35. A refrigerant loop 36 of an air conditioning system 38 may be located in the engine compartment 22. A battery thermal system 40 may also be located in the engine compartment 22. The battery thermal system 40 discussed herein may be employed with a vehicle that has an option of an internal combustion engine or a fuel cell as the power plant 24.

The battery thermal system 40 includes a refrigerant-to-coolant heat exchanger (chiller) 42 and a battery radiator 44. A three-way valve 46 is connected to coolant lines 48 and is controllable to selectively direct a flow of coolant from the battery pack 28 to either the chiller 42 or the battery radiator 44. The battery radiator 44 may be mounted adjacent to the radiator 32 so that air flow (indicated by arrow 47) that is drawn through the radiator 32 by the cooling fan 34 will also be drawn through the battery radiator 44. The chiller 42 is connected, via refrigerant lines 50, to the air conditioning system 38.

Coolant lines in FIGS. 1-3 are indicated by dashed lines, while refrigerant lines are indicated by dash-dot lines. The coolant may be a common coolant (a water and ethylene glycol mix) such as that typically used in an internal combustion engine, may be a specialized coolant using de-ionized water and/or special inhibitors, or may be some other type of liquid coolant with suitable heat transfer properties. The refrigerant may be whatever refrigerant happens to be employed in the air conditioning system 38 of the vehicle 20.

The battery thermal system 40 also includes an air separator 52, which receives coolant from both the chiller 42 and the battery radiator 44, an electric pump 54, which receives coolant from the air separator 52, and a battery coolant heater 56, which receives coolant from the pump 54 and directs coolant to the battery pack 28. The battery coolant heater 56 may be located either upstream or downstream of the chiller 42. A coolant reservoir 58, having a low pressure cap 60, is connected to the air separator 52, and allows for thermal expansion and contraction of the coolant in the battery thermal system 40. The air separator 52 allows air bubbles in the coolant flow stream to be separated out into the coolant reservoir 58. The electric pump 54 pumps the coolant through the battery thermal system 40 and can be located at other positions in the coolant loop, if so desired. The battery coolant heater 56 can be activated when the ambient temperature is low and it is desirable to warm the battery pack 28.

While the various components of the battery thermal system 40 are shown in the engine compartment 22, as an alternative, some of them can be located under or in the passenger cabin/cargo area 26 if so desired.

Three different modes of operation of the battery thermal system 40 will now be discussed. The arrows on the coolant lines and refrigerant lines indicate the direction of flow of the coolant and refrigerant, respectively.

The first mode is illustrated in FIG. 1 and is a battery cooling mode where the air conditioning system 38 is not operating (thus no refrigerant flow through the chiller 42). This mode employs battery radiator cooling and is most advantageously employed when the ambient air temperature is not too warm and the vehicle operator has not turned on the air conditioning system. In this mode, the pump 54 is activated to pump coolant through the system 40, and the cooling fan 34 is activated to draw air through the battery radiator 44. Also, the three-way valve 46 is actuated to direct the coolant coming from the battery pack 28 to the battery radiator 44 (bypassing the chiller 42). Coolant flowing through the battery pack 28 absorbs heat and then flows through the coolant lines 48 to the battery radiator 44, where air flow 47 through the battery radiator 44 absorbs heat from the coolant. The coolant then flows through the air separator 52, where air bubbles in the coolant flow stream are separated out into the coolant reservoir 58. The coolant flows through the battery coolant heater 56, which is turned off, and back to the battery pack 28. This coolant flow path is advantageous when the battery radiator 44 is sufficient to provide cooling for the battery pack 28 because a only minimal amount of power consumption is used for battery cooling. This mode can be employed while operating the vehicle 20 and while the vehicle 20 is plugged-in for battery recharging.

The second mode is illustrated in FIG. 2 and is a battery cooling mode where the air conditioning system 38 is operating. The pump 54 is activated and the three-way valve 46 is actuated to direct the coolant coming from the battery pack 28 to the chiller 42 (bypassing the battery radiator 44). Coolant flowing through the battery pack 28 absorbs heat and then flows through the coolant lines 48 to the chiller 42. Also, cooled refrigerant flows through the refrigerant lines 50 and the chiller 42. The refrigerant absorbs heat from the coolant, which then flows through the air separator 52, pump 54 and deactivated heater 56 to the battery pack 28. While this mode uses more energy than the first mode, it is much more effective at cooling the battery pack 28. This mode can be employed while operating the vehicle 20 and while the vehicle 20 is plugged-in for battery recharging if the air conditioning system can be operated on electric power.

The third mode is illustrated in FIG. 3 and is a battery heating mode where there are cold ambient conditions. The pump 54 is activated and the three-way valve 46 is actuated to direct the coolant coming from the battery pack 28 to the chiller 42 (bypassing the battery radiator 44). In this mode, no cooled refrigerant flows through the chiller 42, so little or no heat transfer takes place. The battery coolant heater 56 is activated and transfers heat to the coolant as it passes through. The heat is then transferred to the battery pack 28 as the coolant flows through it, thus warming the battery pack 28. This mode can also be employed while operating the vehicle 20 or while the vehicle 20 is plugged-in for battery recharging.

While certain embodiments of the present invention have been described in detail, those familiar with the art to which this invention relates will recognize various alternative designs and embodiments for practicing the invention as defined by the following claims.

What is claimed is:

1. A vehicle comprising:
   a power plant;
   a radiator configured to cool the power plant;
   a cooling fan located adjacent to the radiator and configured to draw air through the radiator;
   an air conditioning system;
   a battery pack; and
   a battery thermal system including a battery radiator located adjacent to the radiator and in fluid communication with the battery pack; a battery coolant heater located upstream of the battery pack and configured to receive a flow of a liquid coolant therethrough, whereby the battery coolant heater is activatable to heat the coolant flowing therethrough; and an electric pump for pumping the liquid coolant through the battery pack, the battery radiator, and the battery coolant heater; and wherein the battery thermal system includes a refrigerant-to-coolant heat exchanger configured to selectively receive a refrigerant from the air conditioning system, and a valve configured to receive the liquid coolant from the battery pack and selectively redirect the liquid coolant to one of the refrigerant-to-coolant heat exchanger and the battery radiator.

2. The vehicle of claim 1 wherein the battery thermal system includes an air separator configured to receive a flow of liquid coolant therethrough and separate air bubbles from the liquid in the liquid coolant.

3. The vehicle of claim 1 wherein the power plant is an internal combustion engine.

4. The vehicle of claim 1 wherein the power plant is a fuel cell.

5. The vehicle of claim 1 including an electric motor drivingly engaging the cooling fan.

6. The vehicle of claim 1 including a plug-in charger operatively engaging the battery pack.

7. A vehicle comprising:
   an air conditioning system;
   a battery pack; and
   a battery thermal system including a coolant-to-air battery radiator in fluid communication with the battery pack; a battery coolant heater located upstream of the battery pack and configured to receive a flow of a liquid coolant therethrough, whereby the battery coolant heater is activatable to heat the coolant flowing therethrough; an electric pump for pumping the liquid coolant through the battery pack, the battery radiator, and the battery coolant heater; a refrigerant-to-coolant heat exchanger configured to selectively receive a refrigerant from the air conditioning system; and a valve configured to receive the liquid coolant from the battery pack and selectively redirect the liquid coolant to one of the refrigerant-to-coolant heat exchanger and the battery radiator.

8. The vehicle of claim 7 comprising:
a power plant; and
A radiator configured to cool the power plant, the radiator located adjacent to the battery radiator.

* * * * *